March 24, 1925. 1,530,948
J. A. KIMBALL
AUTO HEADLIGHT CONTROL
Filed Dec. 7, 1923 2 Sheets-Sheet 1
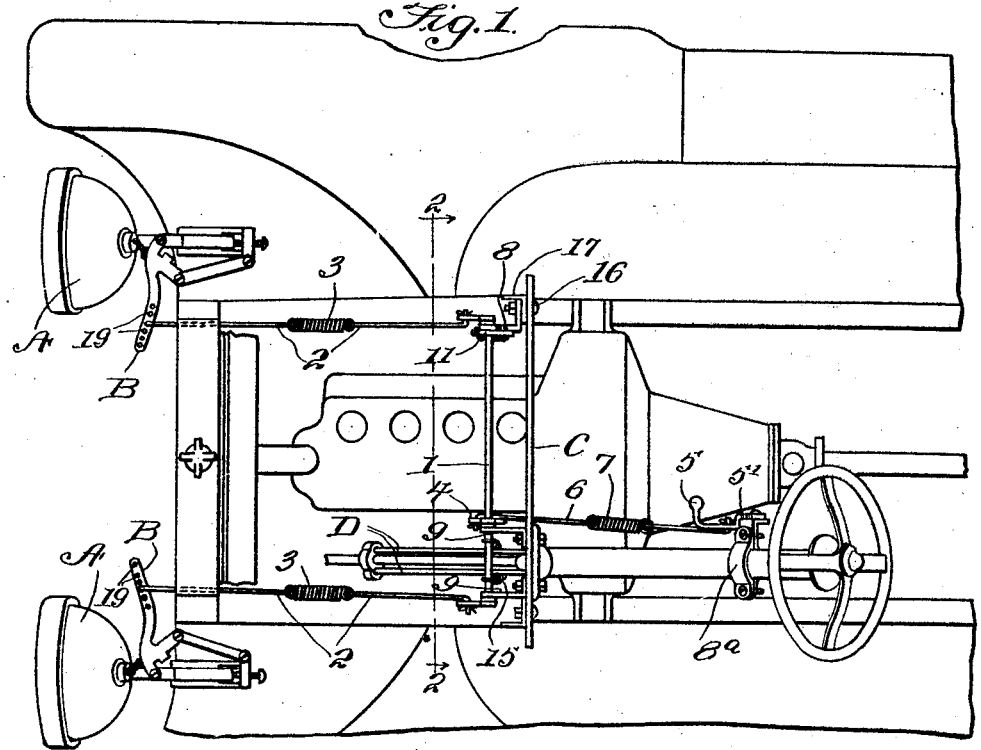
Fig. 1.
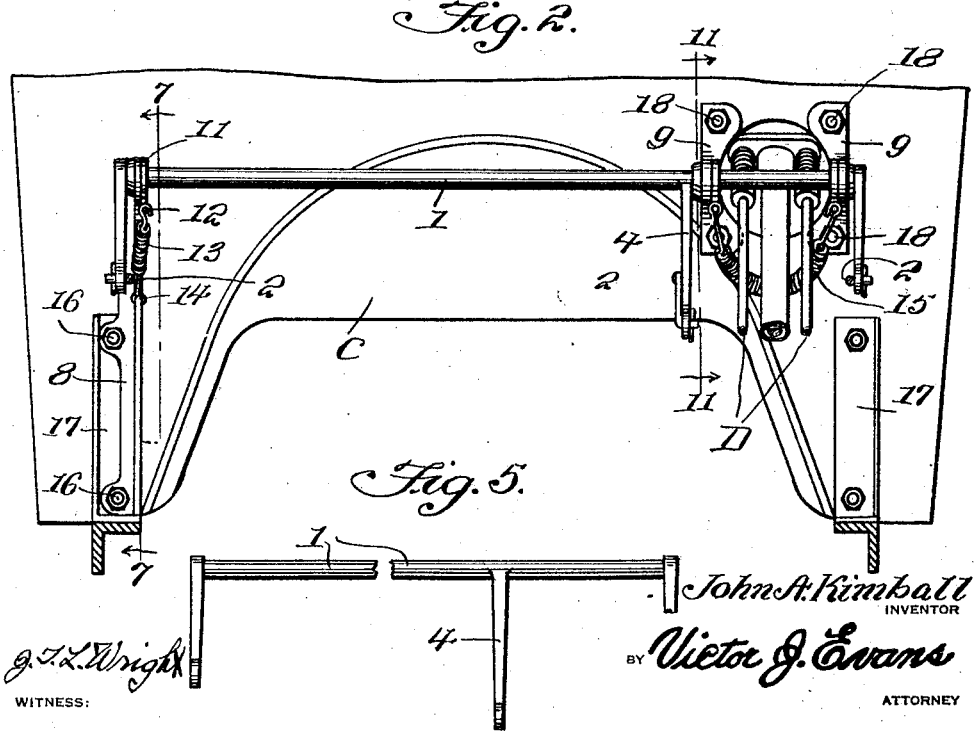
Fig. 2.
Fig. 5.
John A. Kimball
INVENTOR
BY Victor J. Evans
ATTORNEY
WITNESS: J. L. Wright March 24, 1925.
J. A. KIMBALL
AUTO HEADLIGHT CONTROL
Filed Dec. 7, 1923
1,530,948
2 Sheets-Sheet 2
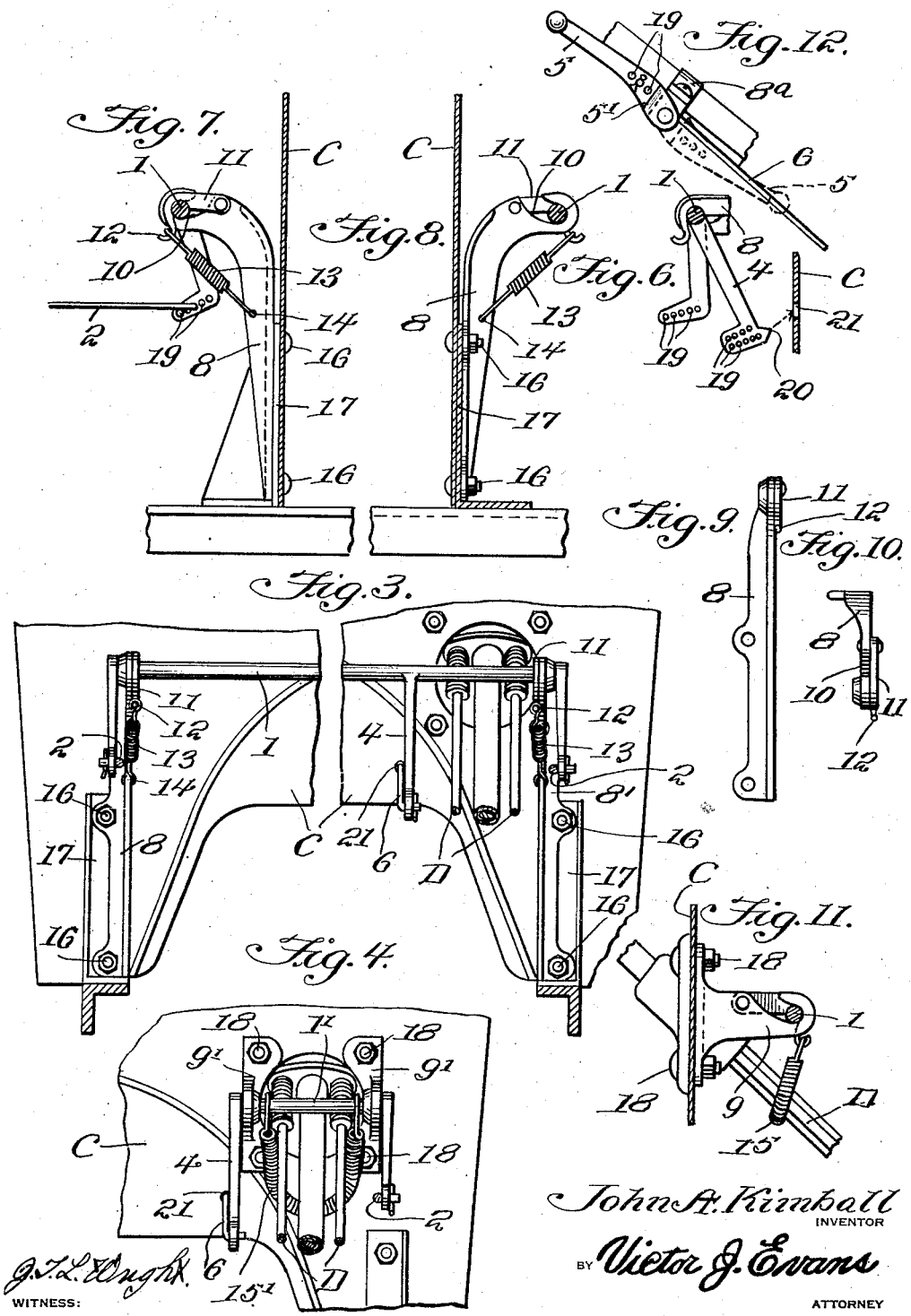

Patented Mar. 24, 1925.

1,530,948

UNITED STATES PATENT OFFICE.

JOHN A. KIMBALL, OF TAYLORVILLE, ILLINOIS.

AUTO HEADLIGHT CONTROL.

Application filed December 7, 1923. Serial No. 679,225.

*To all whom it may concern:*

Be it known that I, JOHN A. KIMBALL, a citizen of the United States, residing at Taylorville, in the county of Christian and State of Illinois, have invented new and useful Improvements in Auto Headlight Controls, of which the following is a specification.

This invention relates to means for tilting the lamps of a motor vehicle so as to prevent the glare from the lamps from blinding the drivers of other cars and pedestrians, the general object of the invention being to provide means whereby the controlling parts can be easily and quickly attached to existing models of vehicles, with but few changes thereto.

Another object of the invention is to provide means for preventing rattling of the parts.

A further object of the invention is to provide means for adjusting the parts so that the lamps can be moved to the desired extent and also to provide means for easily removing those parts which will be in the way when the motor is to be cleaned or repaired.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a diagrammatic plan view of a motor vehicle showing the invention in use.

Figure 2 is a section on line 2—2 of Figure 1.

Figure 3 is a view similar to Figure 2 but showing a modification.

Figure 4 is a view of another modification.

Figure 5 is a view of the crank shaft.

Figure 6 is a detail sectional view through the crank shaft and showing the means for "spotting" the hole for the actuating rod.

Figure 7 is a section on line 7—7 of Figure 2.

Figure 8 is a view of the reverse side of the part shown in Figure 7.

Figure 9 is an edge view of the bracket shown in Figure 7.

Figure 10 is a top view thereof.

Figure 11 is a section on line 11—11 of Figure 2.

Figure 12 is a view of the operating lever.

Referring to Figure 1, A indicates the headlamps of a motor vehicle and B indicates a lever which is so connected with each lamp that when the lever is moved rearwardly it will raise the lamp, the lamps being normally held tilted downwardly by springs for casting the rays of light upon the road directly ahead of the vehicle so as to not blind pedestrians and the drivers of other vehicles. A crank shaft 1 is rotatably mounted upon the dash C of the vehicle and the end cranks of this shaft are connected with the levers B by the connections 2 which include the springs 3. A crank 4 on the shaft 1 is connected to a hand lever 5 by the connection 6 which includes the spring 7, the lever 5 being carried by a clamp $8^a$ which is placed on the steering post of the vehicle adjacent the steering wheel. This clamp is formed of two sections which are clamped together around the post and one of which is provided with an offset part to which the lever 5 is pivoted. This lever 5 is provided with an offset part 5' which will engage parts of the clamp so that the movement of the lever is limited in two directions. In one of its limits of movement the lever will hold the parts with the lamps in raised position and in another position the lever will permit the springs to lower the lamps. The handle part of the lever is bent at right angles so as to form a crank to facilitate movement of the lever by the hand of the operator.

Figures 1 and 2 show the crank shaft as being supported from the dash by the bracket 8 and the pair of brackets 9. Each bracket is provided with a bayonet slot 10 for receivng the shaft and the shaft is held in the slots by the latch members 11, one of which is pivoted to each bracket and each latch member is provided with a hook 12 on its outer end. The latch member on the bracket 8 has its hook engaged by a spring 13 which is fastened to the bracket at 14 and the hooks on the brackets 9 are engaged by the ends of a spring 15 which is looped around the control rods D and the steering post. Besides holding the latch members in locking position this spring 15 also prevents shattering of the control rods D. The bracket 8 is held to the dash by the bolts 16 which hold the dash to its support 17 and the brackets 9 are engaged by the bolts 18 of the steering column. I prefer to make the brackets of the shape shown in the drawings though I do not wish to be limited to this shape.

Instead of using the brackets shown in Figures 1 and 2 I may omit the brackets 9 and use two of the brackets 8, as shown at 8' in Figure 3 or I may use the two brackets 9, as shown at 9' in Figure 4, and omit the other brackets. In this latter case the crank shaft is of short length, as shown at 1', and it is only provided with two cranks, one of which is connected with the operating handle of the steering column and the other with the lamp mechanism. In this case the two lamps are connected together so that they will be rocked in unison. This figure shows the spring 15' as engaging the crank shaft as the brackets are not provided with latch members.

In all the forms I provide the cranks of the shaft and the lever 5 and the levers B each with a plurality of holes 19 so as to permit adjustment of the parts and the crank 4 is formed with a point 20 for "spotting" the hole 21 in the dash through which the connection 6 is to pass.

From the foregoing it will be seen that I have provided simple and effective means for supporting the parts and the attachment can be placed on existing models of vehicles with but slight change thereto. The brackets are held in place by the bolts already in the vehicle and by making the shaft removable it can be taken out of the brackets when the head of the motor is to be removed. This removal of the shaft is unnecessary in the construction shown in Figure 4. The springs will prevent rattling of the parts.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A vehicle headlight controlling device including a crank shaft, a set of brackets for supporting the same, each bracket being held to the dash by the bolts already in the dash and each bracket having a bayonet slot for receiving the shaft and spring means holding the shaft in the slots and encircling the gas and spark control rods of the vehicle.

2. A vehicle headlight controlling device including a crank shaft, the cranks of which are each provided with a plurality of holes for receiving the connecting members and one arm of the shaft having a point for making a mark on the dash for indicating where the hole for the connecting member is to be located.

3. A vehicle headlight controlling device comprising a crank shaft, a set of brackets for supporting the same from the dash, connecting means between some of the cranks and the lamps, such means including springs, a hand lever supported from the steering post, a connection between the hand lever and another crank of the shaft, such connection passing through the dash and including a spring and spring means for holding the shaft in its brackets and preventing vibrations of the shaft.

In testimony whereof I affix my signature.

JOHN A. KIMBALL.